(12) United States Patent
Reifer et al.

(10) Patent No.: US 6,421,727 B1
(45) Date of Patent: Jul. 16, 2002

(54) INTERNETWORKING SYSTEM AND METHOD FOR A GLOBAL TELECOMMUNICATIONS NETWORK

(76) Inventors: Abraham Issachar Reifer, 906 Brentwood La., Silver Spring, MD (US) 20902; Paul Joseph Peck, 1318 N. Abingdon St., Arlington, VA (US) 22207

( * ) Notice: Subject to any disclaimer, the term of this patent is extended or adjusted under 35 U.S.C. 154(b) by 0 days.

(21) Appl. No.: 09/158,663

(22) Filed: Sep. 22, 1998

(51) Int. Cl.[7] ............................................. G06F 15/173
(52) U.S. Cl. ....................... 709/225; 709/226; 709/229; 709/203
(58) Field of Search ................................ 709/225, 226, 709/229, 217, 203

(56) References Cited

U.S. PATENT DOCUMENTS

| | | | | |
|---|---|---|---|---|
| 5,517,562 A | * | 5/1996 | McConnell | 379/207 |
| 5,815,809 A | * | 9/1998 | Ward et al. | 455/428 |
| 5,870,667 A | * | 2/1999 | Globuschutz | 455/67.1 |
| 5,940,739 A | * | 8/1999 | Conrad et al. | 455/13.1 |
| 6,021,433 A | * | 2/2000 | Payne et al. | 709/219 |
| 6,032,184 A | * | 2/2000 | Cogger et al. | 709/223 |
| 6,058,175 A | * | 5/2000 | Schultz | 370/352 |
| 6,088,457 A | * | 7/2000 | Parkinson et al. | 340/825.72 |
| 6,161,128 A | * | 12/2000 | Smyk | 709/205 |

* cited by examiner

Primary Examiner—Mehmet B. Geckil
(74) Attorney, Agent, or Firm—Baker & Hostetler, LLP

(57) ABSTRACT

A method and system for providing service activation capability from Service Providers to end-customers in a global Iridium type telecommunications system. The inventive method includes the steps of utilizing a browser to download a program and executing the program to provide for service provisioning. In the illustrative embodiment, the browser is a Web browser, the program is a Java application and the inventive method further includes the steps of providing service activation, suspension, reactivation and deactivation. Telephony services are provisioned along with paging and roaming. Capcode generation, allocation and ordering are also supported along with tracking and maintenance of capcode status.

39 Claims, 13 Drawing Sheets

FIG. 8
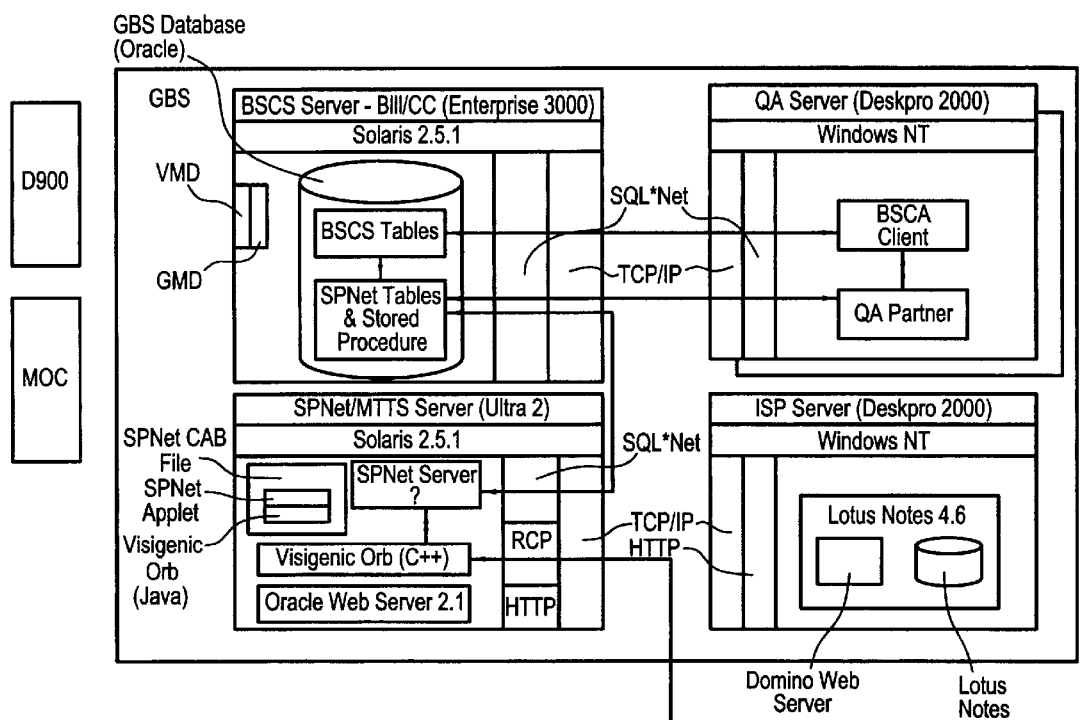
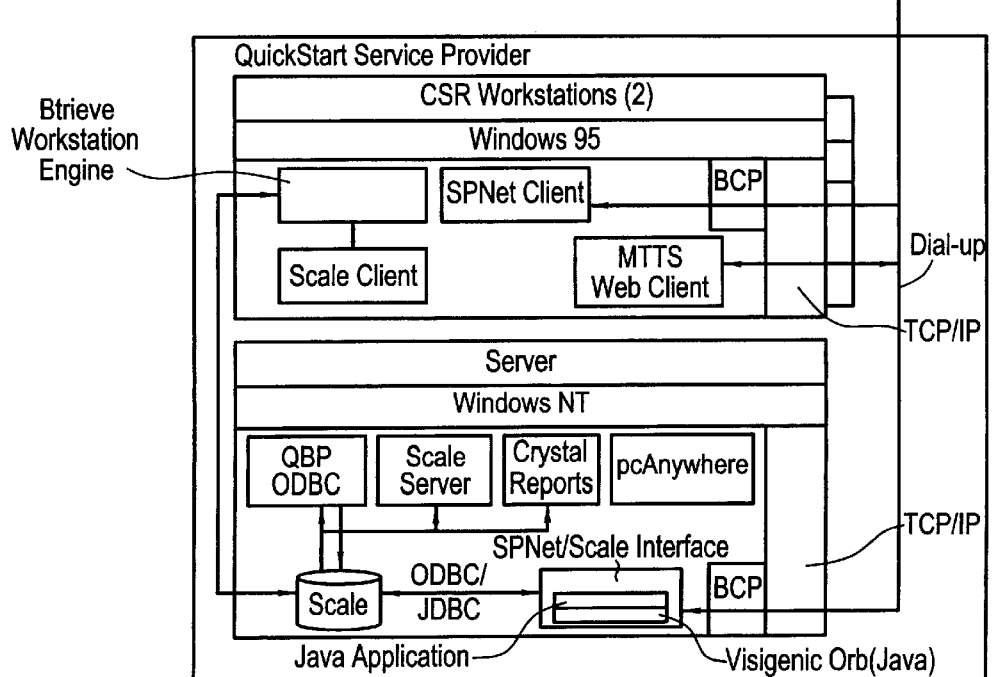

INTERNETWORKING SYSTEM AND METHOD FOR A GLOBAL TELECOMMUNICATIONS NETWORK

FIELD OF THE INVENTION

The present invention relates to telecommunications networks and, in particular, to turnkey systems for operating and managing a telecommunications network.

BACKGROUND OF THE INVENTION

With the development of a global economy, business people who regularly travel internationally are a fast growing breed. To meet the needs of business travelers and others, satellite-based global telecommunications networks are being developed. The first such network is to be commercially activated by Iridium, LLC on Nov. 1, 1998. The network is called "Iridium". Iridium is a satellite-based, wireless personal communications network designed to permit any type of telephone transmission (e.g., voice, paging, facsimile or data) to reach its destination anywhere on earth. The Iridium system includes a constellation of 66-satellites each weighing approximately 689 kilograms (1500 pounds). The satellites will orbit above the Earth at an altitude of 780 kilometers (485 statute miles). Unlike geostationary communication satellites, which are located 41,300 kilometers (25,680 statute miles) above the Earth, the low Earth orbit of the Iridium satellites, as well as recent advances in microelectronics, make it possible to provide worldwide cellular telephone coverage via handheld phones.

The network is designed to simplify communications for business professionals, travelers, residents of rural or undeveloped areas, disaster relief teams, and other users who need the features and convenience of wireless, handheld phones with worldwide reach. The network will require numerous entities in many different countries to work together. Such entities involve governments, service. providers, industry clearinghouses, and others.

Gateways have been set up. to provide Iridium type services within national or regional boundaries. Gateways interconnect the satellite constellation with public switched telephone networks (PSTNs), making communication possible between network cellular phones and any other telephone in the world. Gateway operators provide service activation, customer support, payment and settlement processing, service provider management, usage collection, and retail rating.

Service providers and Roaming Partners provide retail telecommunications services from the Gateway to end users. The Service Providers and Roaming Partners require access to data stored at the Gateway relative to customers of the Service Provider. However, there is a further need for a method and system for allowing each Service Provider to access only those files stored at the Gateway that relate to the customers of the Service Provider, not those of other Service Providers.

Accordingly, a need exists in the art for a baseline set of tools and processes to enable a Service Provider to sell Iridium type service. Specifically, there is a need for an integrated tool set designed to allow Service Providers and Roaming Partners access to a shared data set on a secure basis.

SUMMARY OF THE INVENTION

The need in the art is addressed by the system and method of the present invention for providing service activation capability from Service Providers to end-customers in a global Iridium type telecommunications system. The inventive method includes the steps of utilizing a browser to download a program and executing the program to provide for service provisioning.

In the illustrative embodiment, the browser is a Web browser, the program is a Java application and the inventive method further includes the steps of providing service activation, suspension, reactivation and deactivation. Telephony services are provisioned along with paging and roaming. Capcode generation, allocation and ordering are also supported along with tracking and maintenance of capcode status.

BRIEF DESCRIPTION OF THE FIGURES

FIG. 8 illustrates the application architecture of the GBS and an Iridium QuickStart Service Provider.

DETAILED DESCRIPTION

The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The following Glossary may be used throughout this document.

| GLOSSARY | |
|---|---|
| ADF | Application Design Facility |
| AFP | Advanced Function Presentation |
| AFPDS | Advanced Function Presentation Data Stream |

-continued

GLOSSARY

| ALE | Application Layout Editor |
|---|---|
| BCH | Bill Cycle Handler |
| BER | Billable Event Record |
| BGH | Bill Generation Handler |
| BLOB | Binary Large Object |
| CE | Composition Engine |
| DFE | Data Format Editor |
| EDIFACT | EDIFACT(Electronic Data Interchange for Administration, Commerce, and Transport) |
| EMFE | Extract, Merge & Format Engine |
| FDE | Firm Data Editor |
| FIH | File Input Handler |
| GBS | Gateway Business System |
| GL | General Ledger |
| GW | Gateway |
| Metacode | Xerox printing language |
| lex/yacc | UNIX scripting language |
| OCC | Other Credits and Charges |
| PBCH | Pre-Bill Cycle Handler |
| PCE | Post Composition Engine |
| PCL | Print Control Language |
| PPM | Post Processing Module |
| PSF | Print Services Facility |
| RTX | Rated Transaction |
| SCH | Service Provider Credit Handler |
| SER | Settleable Event Record |
| SIH | Service Provider Invoice Handler |
| SP | Service Provider |
| TIMM | Telecommunication Invoice for Multiple Markets |

Figure 1:
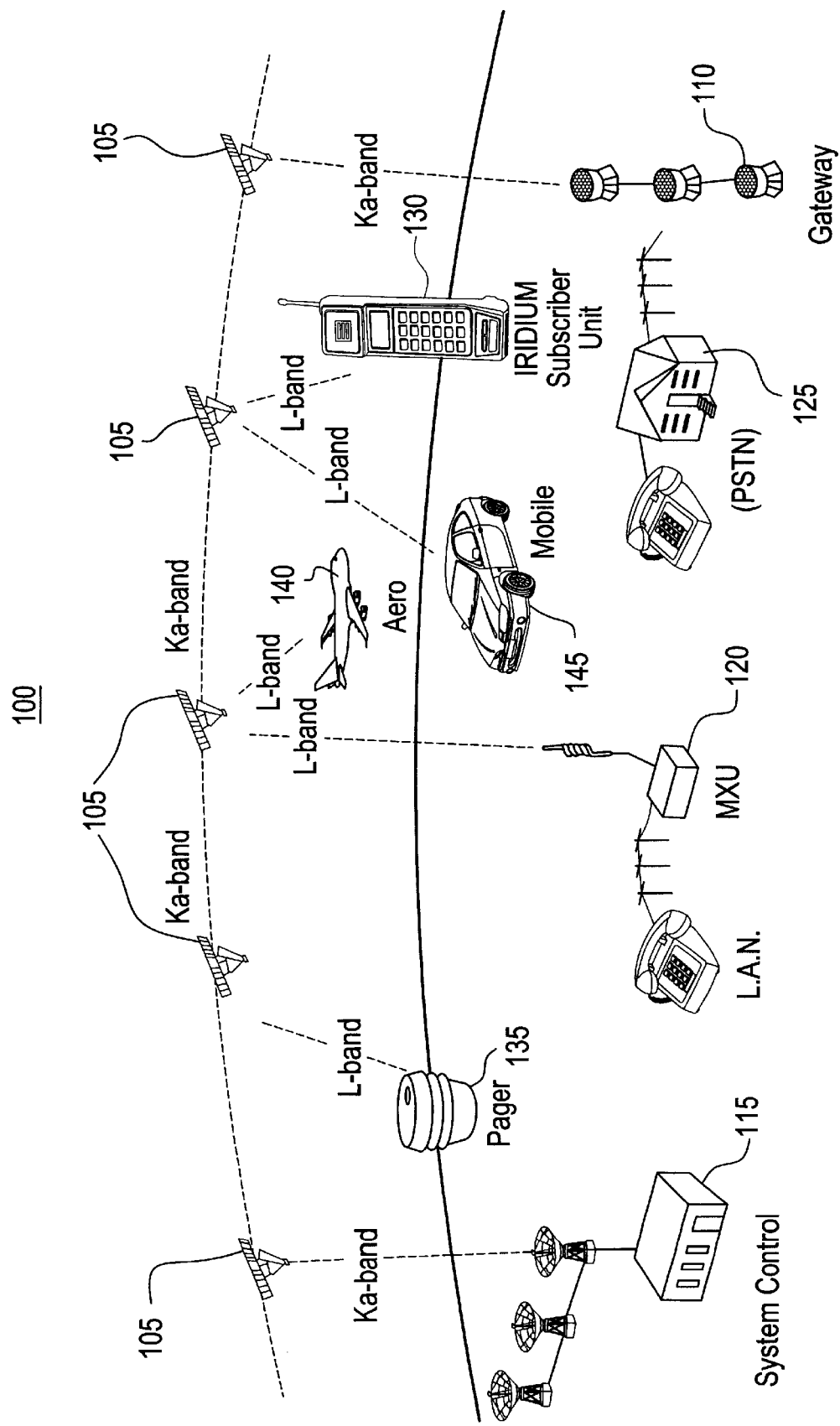
FIG. 1 illustrates a global telecommunications network which may use the present invention.

FIG. 1 illustrates a telecommunications network which may be used with the present invention. The network 100 includes low earth orbiting satellites 105, gateways 110, system control 115, and Mobile Exchange Units 120 (MXU). System Control 115 serves as the central management component for the network 100. Gateways 110 interconnect the satellite constellation 105 with public switched telephone networks 125 (PSTN), making communication possible between network cellular phones 130 and any other telephone in the world. The M)(U 120 provide access to the network 100 at remote locations. Telecommunications services may also be provided to pagers 135, aircraft 140, and automobiles 145.

Figure 2:
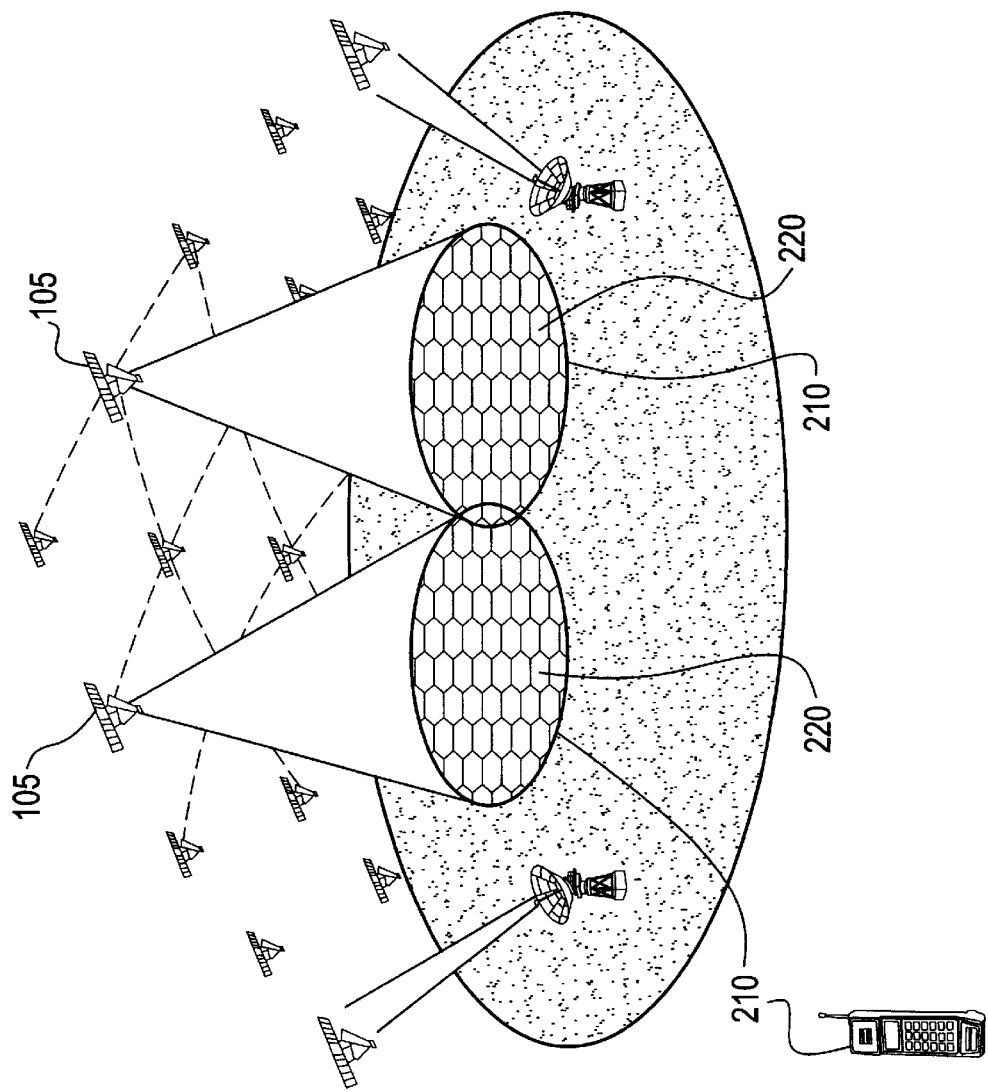
FIG. 2 illustrates satellite footprints of the global telecommunications network of FIG. 1.

The satellites 105 of the network 100 employ intersatellite links 150, or "crosslinks", to communicate directly with each other. These crosslinks 150 provide reliable, high-speed communications between neighboring satellites, allowing call routing and administration to occur efficiently. As illustrated in FIG. 2, each satellite 105 in the constellation has a ground coverage area called a "footprint" 210. The footprint 210 is further divided into smaller areas called "cells" 220. The footprints 210 of the satellites are overlapped to provide maximum coverage.

For a preferred embodiment of the call processing architecture of the network 100, the globe is divided into Location Area Codes (LACs). Each LAC is a service location for the network 100. Each gateway 110 services a certain set of LACs. For example, when a user makes a call from his/her cellular phone 130 to a particular location, the cellular phone 130 first links with a satellite 150 which has a cell servicing his/her current LAC. The cellular phone 130 requests a satellite channel for the call. The request is sent to the gateway 110 which services the caller's LAC. This gateway 110 then initiates the opening of a channel between phone 130 and the satellite 110. Once the channel is established, the signal for the phone call is routed through the crosslinks 150 of the satellites 105 to the gateway 110 servicing the LAC of the callers destination. This gateway 110 then sends the call to the PSTN 125 which routes the signal to the particular phone called.

Figure 3:
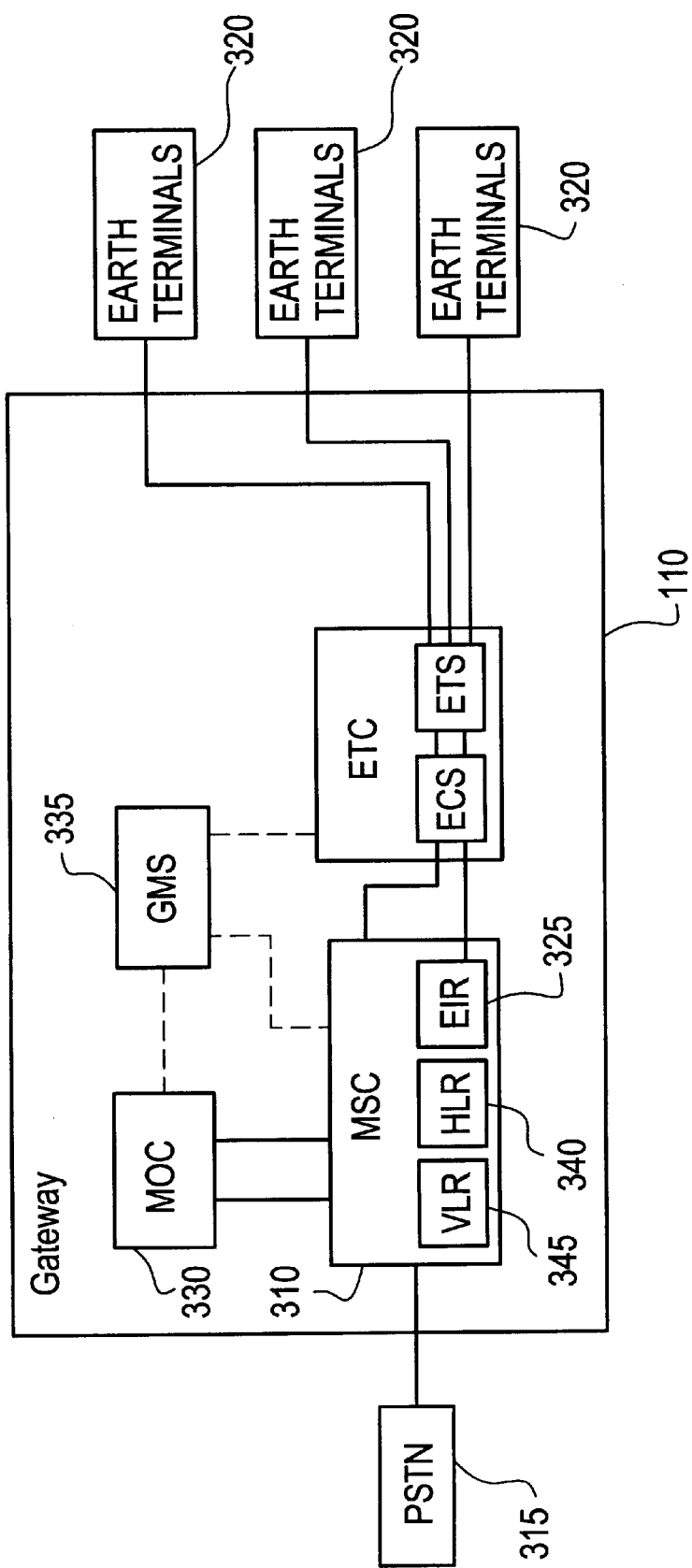
FIG. 3 illustrates a gateway of the global telecommunications network of FIG. 1.

FIG. 3 illustrates in more detail a preferred embodiment of the gateway 110 of the network 100. The heart of the gateway 110 is the Mobile Switching Center 310 (MSC) or the "switch". An example of a switch 310 which may be used is the Siemens GSM-D900 switch. The switch 310 has two "sides": a land side which connects to the local telephone network via the PSTN 315, and a mobile side which connects to Earth Terminal Controllers 320 which communicate with the satellite constellation 105 using K-band radio links. Information for the physical subscriber equipment (cellular phone 130, pager 135, etc.) is kept in the Equipment Identification Register 325(EIR). The gateway's 110 Message Origination Controller 330 (MOC) supports a variety of messaging services such as direct messaging to pagers. The Gateway Management System 335 (GMS) provides operations, administration, and maintenance support for each of the gateway subsystems.

In addition to the EIR 325, the switch 330 includes a Home Location Register 340 (HLR) and a Visited Location Register 345 (VLR). The HLR 340 stores subscriber service information for the "Home Gateway". A Home Gateway is assigned to each subscriber to the network 100 and is related to the LAC at which the subscriber is based. The Home Gateway is responsible for granting system access. Whenever a subscriber places or receives a call, the network 100 will determine the subscriber's location with accuracy sufficient for call control. The Home Gateway will receive and evaluate this location information to determine whether it is permissible for the call to proceed. This feature is essential to help ensure compliance with calling restriction laws in nations where such laws exist.

The Home Gateway is also responsible for the assignment of a Visited Gateway as part of the system access process. Subscriber location information is used to index into a map of the world kept at the Home Gateway. This determines a LAC for the visited location which in turn will be used to identify a Visited Gateway which will serve and control the mobile subscriber end of a call.

The Visited Gateway temporarily retains a copy of select subscriber information in its VLR 345. This information remains within the Visited Gateway until the subscriber "roams" into a new Visited Gateway territory or until it expires. When a subscriber is at, "Home", the Visited Gateway and the Home Gateway are one and the same.

Figure 4:
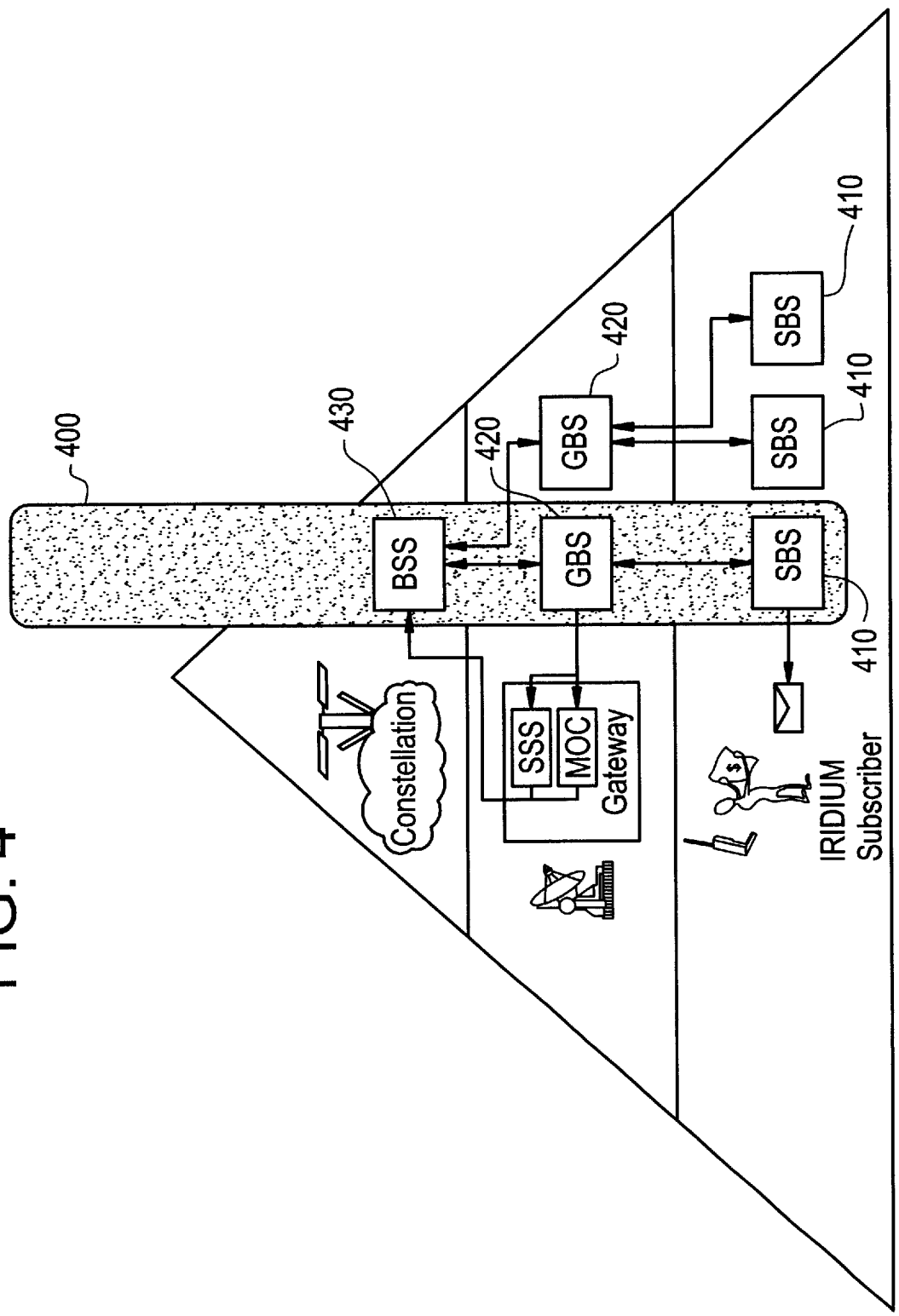
FIG. 4 illustrates a business system for managing the telecommunications network of FIG. 1.

To manage usage information of the network 100, a business system 400 is used. FIG. 4 illustrates a preferred embodiment of a business system 400 which may be used with the present invention. The business system 400 comprises three subsystems: the Service Business System 410 (SBS), the Gateway Business System 420 (GBS), and the Business Support System 430 (BSS).

The SBS 410 includes service providers who sell subscriptions for usage of the telecommunications network 100 directly to the consumer and roaming partners who resells usage of the network 100 and also provide other cellular services in their own systems. SBS 410 functions include pre-sales support, service negotiation, general and billing inquiries, payment remittance, pricing and invoicing, receivables management, and account profile maintenance. The functioning of the SBS 410 will be described in more detail later.

The GBS 420 includes gateways 110 (FIG. 1) of the telecommunications network 100 and their operators. The functions of the GBS 420 includes service activation, Tier II customer support, payment and settlement processing, service provider management, usage collection, and retail rating. These functions are performed in the gateways 110. The functioning of the GBS 420 will be described in more detail later.

The functions of the BSS 430 includes gateway relationship management, financial and treasury management, and usage collection. They also include usage verification, revenue distribution, settlement statement generation, and payable/receivable processing. These functions are managed by a Clearinghouse and occurs in the satellites 105.

To more particularly describe the processes of the BSS 430, please refer to FIGS. 5 and 6 in conjunction with the discussion below.

Figure 5:
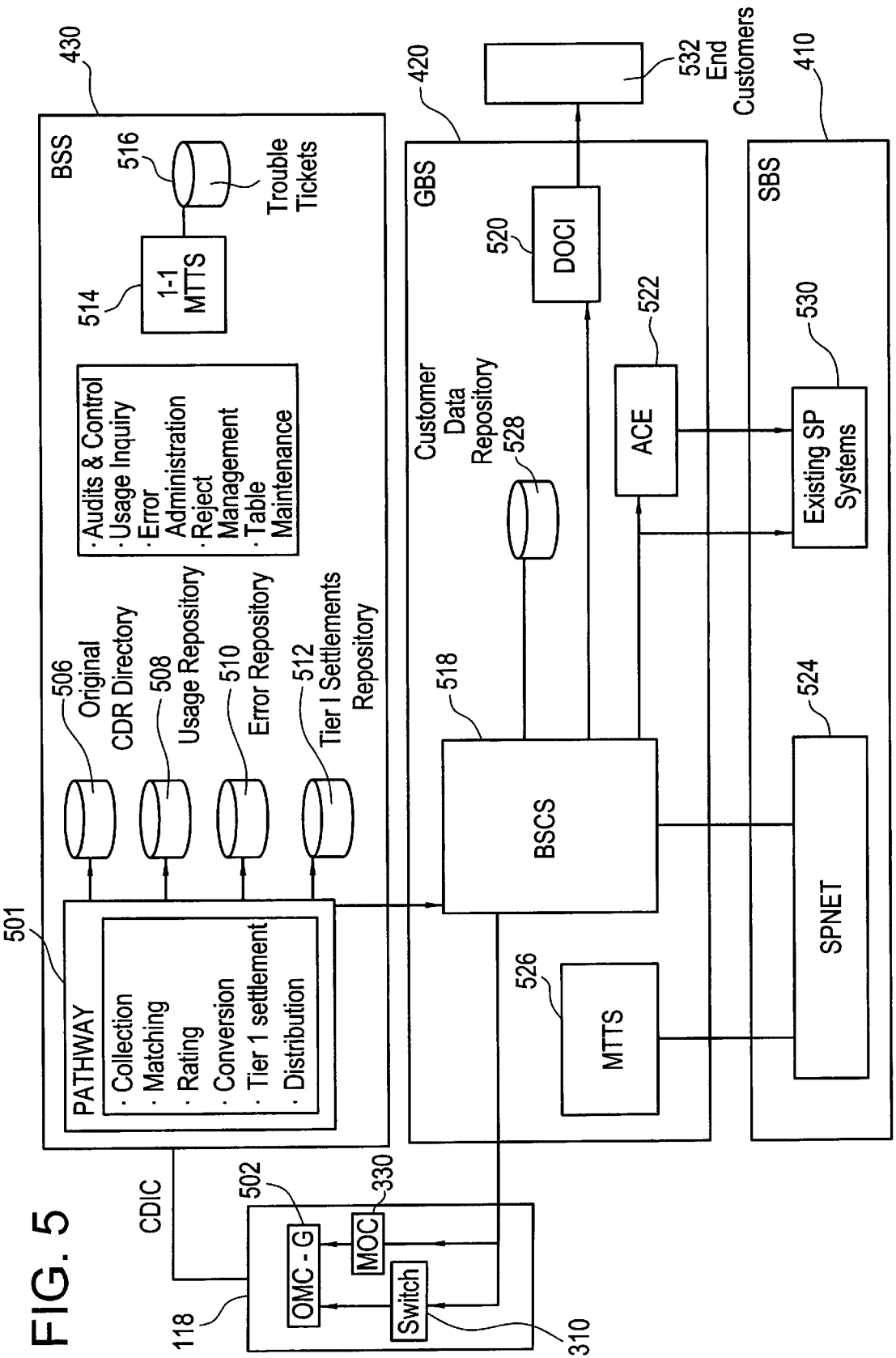
FIG. 5 illustrates in more detail the business system of FIG. 4.

FIG. 5 illustrates in more detail the processes of the business subsystems of the preferred embodiment of the business system 400 in the usage management of the telecommunications network 100, including the BSS 430.

Figure 6:
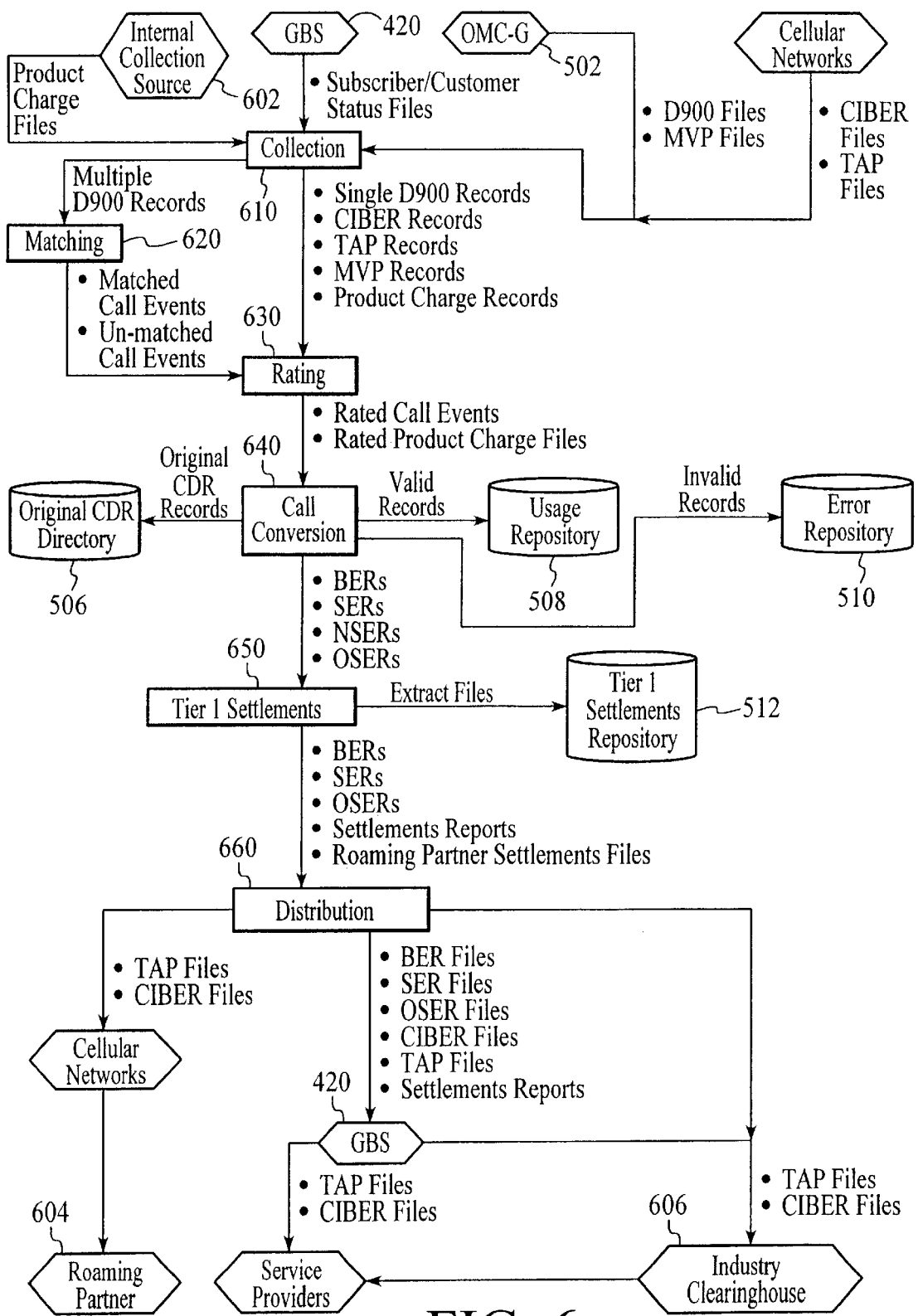
FIG. 6 is a flow chart which illustrates the pathway processes of the business system of FIG. 4.

FIG. 6 is a flow chart illustrating the pathway processes 504 of the BSS 430. The BSS processes begin with the Collection Process, via step 610. Each time a call is made through the network 100, a record of the call event, called a Call Detail Record (CDR) is created in the gateway 110 in the Operations Maintenance Controller-Gateway 502 (OMC-G). These records could be in any number of formats, such as Siemens D900 (D900), Cellular Intercarrier Billing Exchange Roamer (CIBER), Transfer Account Protocol (TAP), and Modular Voice Processing (MVP). The D900 files contain voice records; the MVP files contain messaging records; and the CIBER and TAP files contain roaming partner billing exchange records. The OMC-G 502 notifies the BSS 430 when files containing CDRs in the D900 format are ready for collection. These files are then collected from the OMC-G 502 by the BSS 430. Files containing CDRs in the CIBER and TAP formats are received by the GBS 420. The Collection Process then collects the CIBER and TAP files from the GBS 420. The Collection Process also collects Subscriber and Customer Status files from the GBS 420. These records contain subscriber and cellular customer information, such as activation, deactivation, and service changes. Lastly, the Collection Process collects Product Change files from an internal source 602. These files contain monthly and one-time charge records. The Collection Process then performs a series of validations on the collected files to ensure that the files are complete and properly formatted with industry-standard information, that subsequent BSS processes receive usable information, and that the BSS system integrity is maintained. Once the files have passed validations, the Collection Process converts the CDRs in the D900, MVP, CIBER, TAP, and product charge files into a standard format required for subsequent BSS processing.

Sometimes, multiple CDRs are generated for a single call, called multiple records calls. From the Collection Process, the CDRs in D900 files that are not part of a multiple record call are sent directly to the Rating Process. Those that are part of a multiple record call is first sent to the Matching Process, via step 620, where they are matched with other CDRs in the call. These CDRs are then combined into a single call event and then sent to the Rating Process.

The Rating Process, via step 630, first performs record-level validations. The validation ensures that the files are complete and properly formatted. This pre-processing step ensures that the CDRs, and the information they contain, are valid and comply with industry standards. It then translates this input into an industry standard format called Data Message Handling (DMH). The Rating Process then determines which DMH formatted call events are ratable and which call events are not ratable. A call events is "ratable" if it can be subjected to a rate model or pricing adjustment. For all that are ratable, the Rating Process applies the appropriate pricing model, pricing adjustments, and taxes to determine total charges. The total call revenue is allocated between all entities (service providers, gateway operators, roaming partners, government agencies, etc.) involved in the call event, as each entity receives a portion of the total call revenue. The outputs of the Rating Process are rated call events and rated product charge files which are sent to the Call Conversion Process.

The Call Conversion Process; via step 640, prepares rated call events sent from the Rating Process for storage and distribution. The Call Conversion Process converts the rated call events into formats readable by subsequent repositories, or storage areas for call events, and processes. The Call Conversion Process creates valid records for any rated call events that do not contain errors. Valid records are then loaded in the Usage Repository 508. Invalid records are created for any rated call events that contain errors and stored in the Error Repository 508. The original CDRs are assembled into files for loading into a directory 506 separate from the Usage Repository 508. The original CDRs are important because they serve as a complete record of the original data as it was received from the gateway 110. Rated call events that do not contain errors are converted to different types of event records, such as Billing Event Records (BER), Settlement Event Records (SER), Net Settlement Event Records (NSER), and Outcollect Settlement Event Records (OSER).

The purpose of a BER is to bill a subscriber for using the network 100. BERs are sent to the home gateway of a chargeable subscriber.

The purpose of a SER is to notify gateways 110 of their settlement roles in a call, but not to bill a subscriber. SERs are sent to all gateways 110 involved in the handling of the call, excluding the home gateway.

NSERs contain a summary of all charge information associated with a particular call. NSERs are sent to the Tier 1 Settlements Repository 512.

OSERs contain call activity and charge information for calls in which the customer of a roaming partner is the chargeable party. OSERs are sent to the gateway 110 associated with the roaming partner whose customer made a call.

The Tier I Settlements Process, step 650, receives NSERs from the Call Conversion process and translates them into data-suitable for loading into the Tier 1 Settlements Repository 512. This data takes the form of extract files, which contain important financial and usage information necessary for reporting purposes. These files are held in temporary storage for later release to the Distribution Process. In addition to creating extract files, the Tier I Settlements Process also creates settlement reports and releases them to the GBS 420 and the Clearinghouse.

There are three types of settlement reports: financial reports, usage reports, and operational reports. Financial reports capture daily and month to date financial activity of entities involved in the calls. Usage reports capture the monthly system activity for each gateway 110. Operational reports capture information pertaining to BSS processing, such as collection and distribution, audit, error, reject management, rate package, and roaming agreement information. These reports are released to the Distribution Process where they will be grouped according to their destination point and distributed.

The Distribution Process, via step 660, receives BER files, SER files, OSER files, and settlements reports from the Tier I Settlements Process, and sends them to their final destinations: the GBS 420, roaming partners 604, and industry clearinghouses 606. The Distribution Process first groups and. formats the files according to their type and destination. Once grouped, the BER, SER, and roaming partner settlement files, and settlement reports are ready for final distribution. However, OSER files require conversion into TAP and CIBER files before it is ready for distribution. The BER files are distributed to the home gateway of a subscriber. The SER files are distributed to a gateway 110 involved in the handling of a portion of a call, excluding the home gateway. The original OSER files are distributed to a gateway 110 involved in handling a portion of a call in which a roaming, non-system customer is the chargeable party. The TAP and CIBER files converted from the original OSER files are then distributed to roaming partners and industry clearinghouses. Roaming partner settlement files are distributed to gateways or directly to a roaming partner or industry clearinghouse. These files contain charges payable to roaming partners or receivable from roaming partners, and is used by gateways 110 to perform Tier II settlements processing and reporting. Settlement reports are distributed to all gateways 110 and the Clearinghouse.

The BSCS 518 performs Tier II Settlement whereby the appropriate settlement reports are send to the correct entities, e.g., service providers, roaming partners, or some other entity. As shown in FIG. 5, the BER, SER, and original OSER files and settlement reports resulting from the Distribution Process of the BSS 430 are collected by the GBS 420. These files are then processed by the Billing System and Control System 518 (BSCS). The BSCS 518 first converts the BER and SER files into the Data Message Handler (DMH) format, or Interim Standard 124 (IS124). With files in this format, the BSCS 518 performs wholesale and retail billing. Conversion of the files into the DMH format before billing allows the billing to be done more easily. This billing process rates the call events, taking into account the countries involved in the call, the tax laws of these countries, the currencies of these countries, and the languages of these countries. The result of the wholesale and retail billing performed by the BSCS 518 are files in the TAP format. The billings for direct system customers 532 (retail billing) are forwarded to the DOC1 process 520, which creates invoices which are then sent to the customers. For the billings for service providers 530 (wholesale billing), some service providers require billings in the TAP formats while others require them in the CIBER format. Those that require billings in the TAP format receive the billings directly from the BSCS 518. Those that require billings in the CIBER format have their billings first sent to a software package called 'A Conversion Engine' (ACE) 522, which converts these billings into the CIBER format. The billings are then sent to the service providers of the SBS 410.

The ACE is a commercial software package which performs the following functions:

Modify BSCS output to support unique IRIDIUM requirements.

Change individual fields to show where the calls originate and terminate and whether they are satellite (IRIDIUM type) or cellular (made on a non-IRIDIUM type network).

Change CDRs from NAIG TAP II to alternate output formats so the CDRs are compatible with Service Providers' billing systems.

Enable Gateways to develop their own unique conversion formats.

The main function of ACE is to provide output record conversions for Service Providers (SPs). Converting records for SPs will make it possible for SPs to process IRIDIUM type records without making modifications to their own rating and billing systems.

Figure 7:
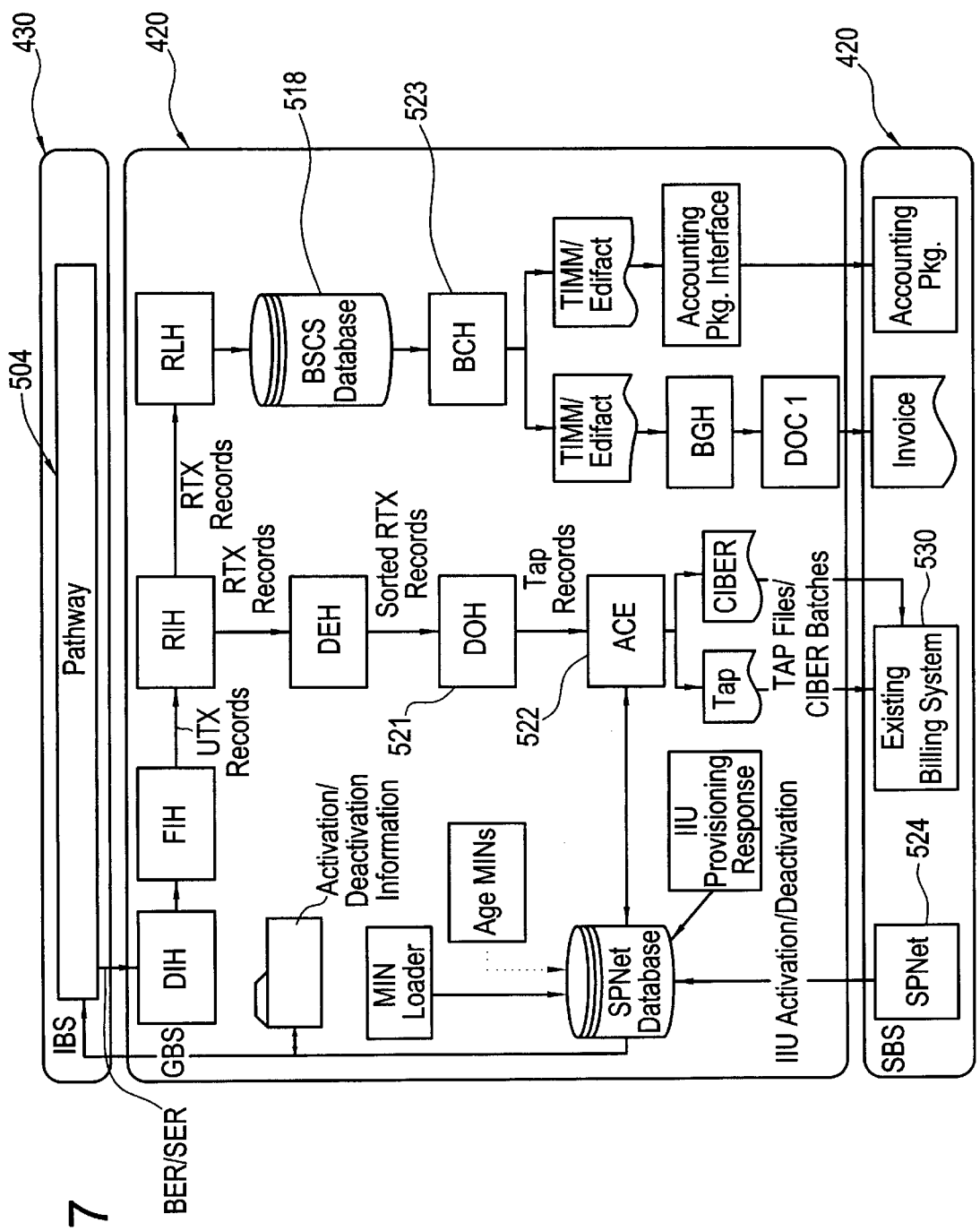
FIG. 7 is a graphical overview of the Gateway Business System.

FIG. 7 is a graphical overview of the Gateway Business System. The responsibilities of the Gateway include:

Deploying a service solution to the Service Providers

Training the Service Providers on the use and operation of the solution

Providing Tier 1 maintenance and support for the Service Providers

Translating training material and documentation from English to the SP's language if necessary.

The Gateway and the SP will establish when and how the data from the GBS will be transferred to the SP. The Gateway provides an invoice ready data feed to the Service Provider on a regular (e.g., monthly) basis.

The GBS performs rating and billing and generates detailed invoices for each subscriber of the SP. The invoices are generated in either the Gateway's currency or in the SP's base currency. The SP will apply any local taxes, perform any additional markups, convert the currency to the customer's currency, and print invoices. This data feed will be created on a per SP basis.

The system and method of the present invention is embodied in a GBS software application called 'SPNet'. SPNet provides activation functionality to Service Providers. As discussed herein, the Service Provider utilizes a Web browser to download and execute a Java application that acts as a front end for service provisioning and customer care. SPNet supports activation, suspension, reactivation, and deactivation for both telephony and paging contracts in BSCS. Additionally, SPNet provides activation support for IRIDIUM type Cellular Roaming Services. Further, SPNet provides functionality to Gateways and Service Providers to support capcode generation, allocation, and ordering processes. In addition, the application supports tracking and maintenance of capcode status during the provisioning process.

FIG. 8 illustrates the application architecture of the GBS and the Iridium QuickStart Service Provider. In FIG. 8, the Iridium QuickStart Service Provider is set up as an LSSP dealer at the Gateway. These Iridium QuickStart Service Provider dealers are assigned to Limited Service Service Provider customer group in the BSCS. The SPNet process of the present invention is effected between an SPNet Client at the QuickStart Service Provider and an SPNet Server at the GBS via a Web type network. In the preferred embodiment, the network is an intranet such as an Iridium network in the case of the Iridium system of the illustrative embodiment. The SPNet system is illustrated in more detail in FIG. 9.

SPNet-Client—The SPNet Client is a Java GUI for customer care and service delivery functions. The SPNet Client is responsible for capturing and displaying data and consists of several dialog modules. Modifications to these dialogs are described later in the following sections:

Contract Administration Module

ICRS Administration Module

System Administration Module

Paging Provisioning Module

SPNet Server—The SPNet Server is a C++ server process that provides the SPNet client with the CORBA interface necessary for creating, reading, updating, and deleting data in the GBS database. The GBS business objects communicate with the GBS database by executing stored procedures.

The GBS business objects include a database connection manager that supports GBS business object to GBS database communication. The database connection manager is a C++ object that manages a pool of persistent database connections. The server also provides service request confirmations through an email notification process.

Figure 9:
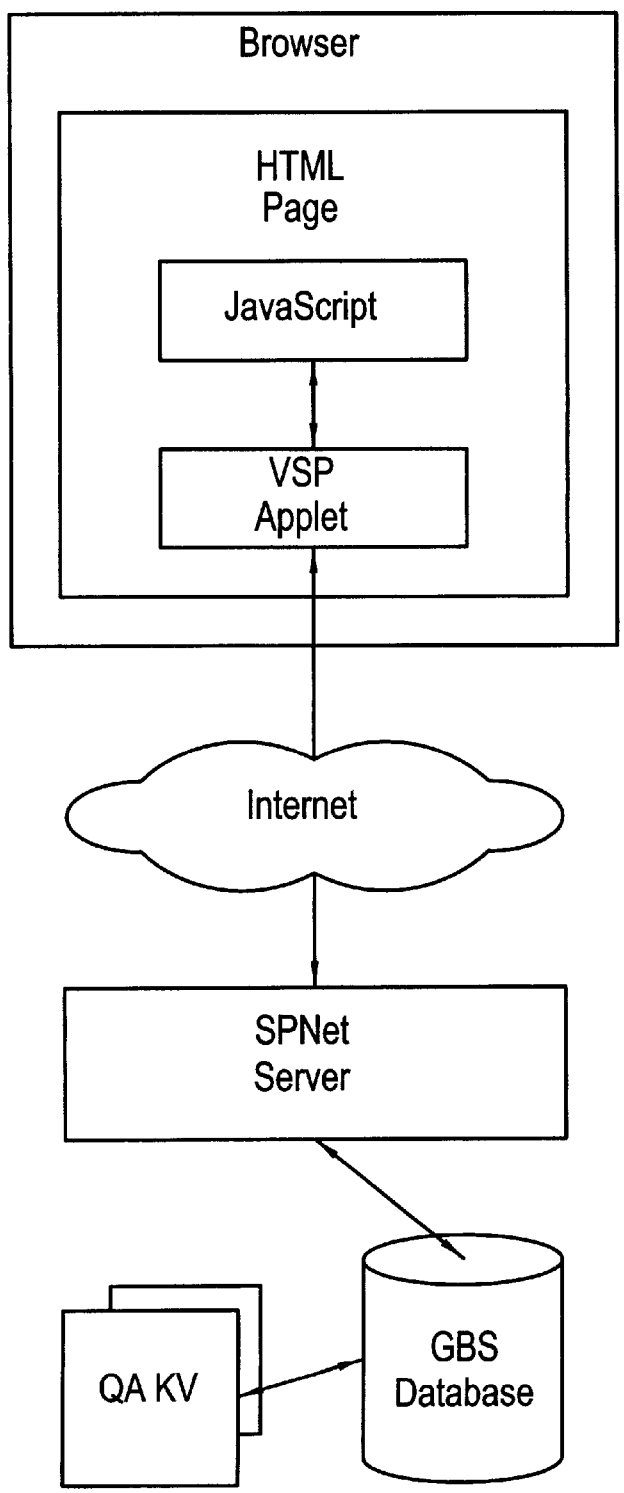
FIG. 9 is a diagram which illustrates the SPNet system of the present invention.

FIG. 9 is a diagram which illustrates the SPNet system of the present invention. In accordance with the present teachings, a browser at the Service Provider's location is used to download a JAVA application which, when executed, provides for service provisioning including service activation, suspension, reactivation and deactivation for telephone, paging, roaming and other services from a database at the GBS.

The SPNet Server supports the SPNet Client, the QSSI, and the VSP applet. The SPNet Server is modified to support SSL security and additional VSP methods. The VSP applet is a lightweight version of the SPNet Client. It provides SSL security, public validation methods, and provides add customer and add contract methods. The JAVA script provides the mechanism to execute methods on the VSP applet. The HTML page provides the form for the end user to fill in the acts as a holder for the JavaScript and VSP applet. Finally, the Browser provides a mechanism for end users to travel to the GBS Web Site, load the HTML page, and execute JavaScript or Java commands.

In the illustrative embodiment, the SPNet application is run on an Pentium computer having 32 MB RAM or greater and a 133 MHz processor or greater. In the illustrative embodiment, the computer meets the following software specifications:

Windows 95, software application which enables dial up capability at 14.4 Kpbs or greater, and Microsoft Internet Explorer 3.01 or comparable browser (properly configured, see below).

To properly configure Microsoft Internet Exploder, the following procedure may be used:
1. Open Microsoft Internet Explorer.
2. Select the "View: Options . . . " menu items from the main menu bar. This will open the "Options" window.
3. Select the "Connection" tab on the "Options" window.
4. Uncheck the "Connect through a proxy server" checkbox located in the "Proxy server" section of the window.
5. Select the "Security" tab on the "Options".
6. Check the "Enable lava programs" checkbox.
7. Select the "Advanced" tab on the "Options".
8. Uncheck the "Enable lava JIT compiler" checkbox.
9. Check the "Enable lava logging" checkbox.
10. Click the "Settings . . . " button located in the "Temporary Internet files" section of the window. This will display the "Settings" window.
11. Click the "Every visit to the page" radio button located in the "Check for newer versions of stored pages:" section of the window.
12. Click the "OK" button of the "Settings" window. This will close the "Settings" window and save all changes made to the window.
13. Click the "OK" button of the "Options" window. This will close the "Options" window and save all changes made to the window.

Figure 10:
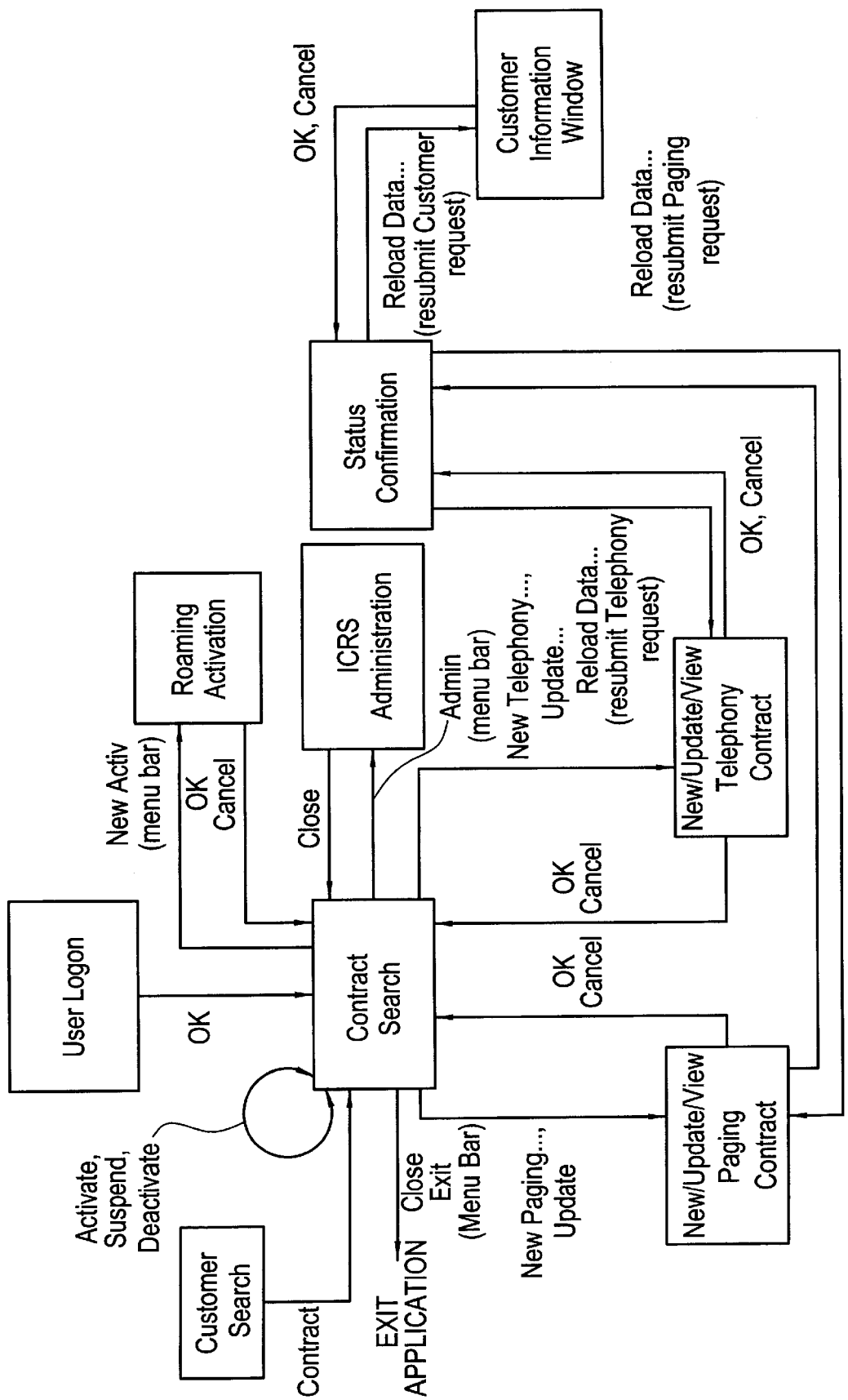
FIG. 10 is a diagram which illustrates the SPNet process of the present invention.

FIG. 10 is a diagram which illustrates the SPNet process of the present invention. In order to successfully log into SPNet, a Service Provider must complete the appropriate start up procedures. Once the Service Provider has downloaded the SPNet application, the Service Provider can log into the system and access the appropriate windows.

To connect with the Gateway, the Service Provider should use the following procedure:
1. Use a dial up application to access the gateway.
2. Once connected with the Gateway, open Microsoft Internet Explorer.
3. Use Internet Explorer to access the appropriate Gateway address via a browser bookmark entry or by typing the Gateway address directly into the browser URL.
4. The SPNet application will be automatically downloaded to the SPs computer.

Logging Into SPNet

After the SPNet application is downloaded the Service Provider will access to an the SPNet—User Logon Window. The Service Provider should log into the SPNet system through the following procedure:
1. Enter the logon supplied to by the system administrator in the Logon ID field.
2. Enter a password in the Password field.
3. Click the OK button.

Using SPNet

SPNet is composed of several user friendly windows. The Service Provider can use these windows to view and enter information relevant to IRIDIUM service. The fields and windows displayed in SPNet are specific to the needs of each Gateway. Most procedures are accomplished through functionality in Search and Detail Windows.

Customer Administration involves the entry, updating, and retrieval of customer information. It is provided via browsers window which offers customer data so that the SP can access a customer's account and address information.

Figure 11:
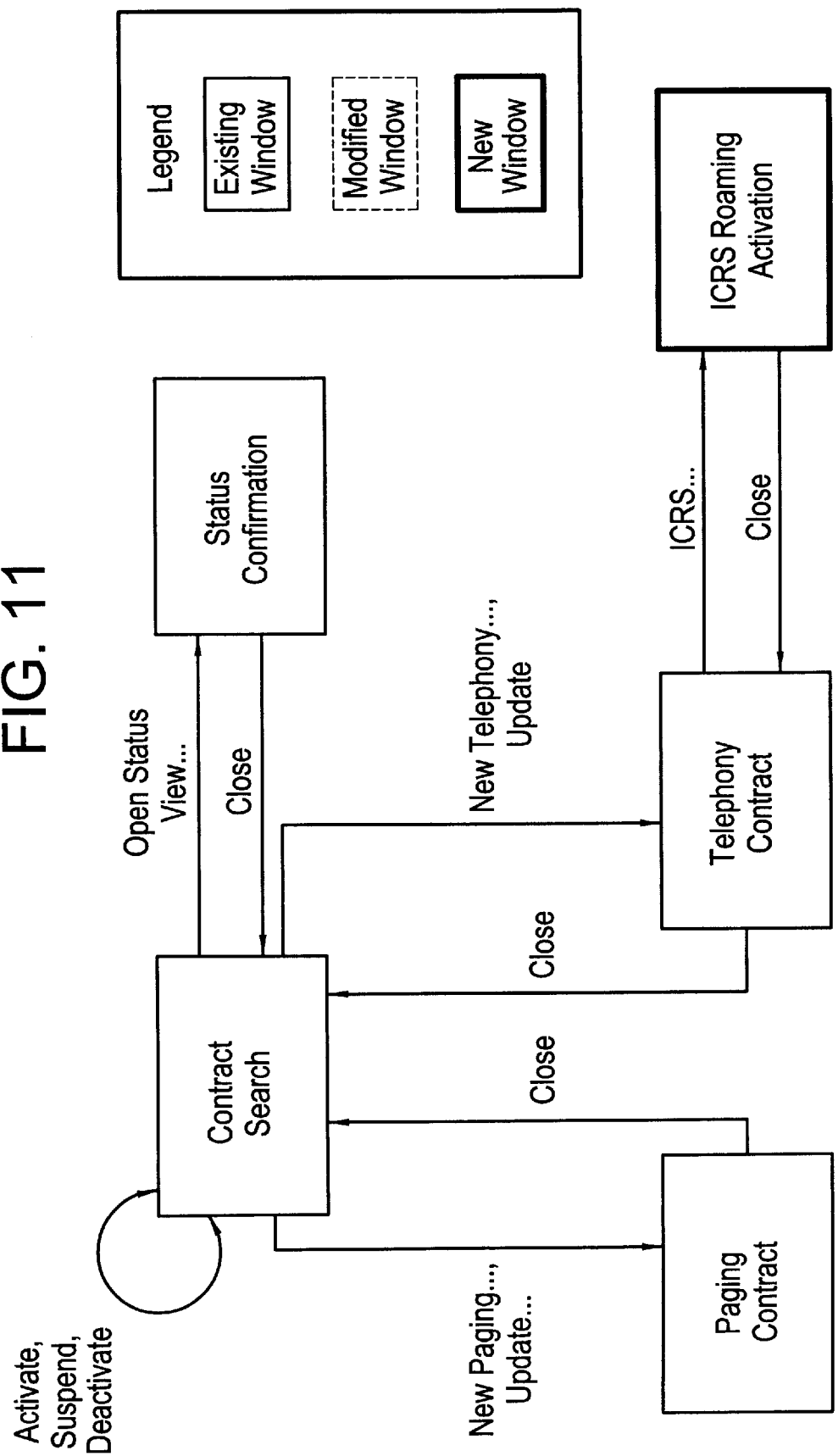
FIG. 11 is a diagram that illustrates the Contract Administration module.

FIG. 11 is a diagram that illustrates the Contract Administration module. Contract Administration allows the SP to enter, update, and retrieve contract information. The windows offer detailed views providing access to information relevant to customer contracts.

A tickler is a notation added to a customer account, used to document special issues or circumstances. Tickler Administration (not shown) allows the SP to enter and retrieve ticklers for customers.

Figure 12:
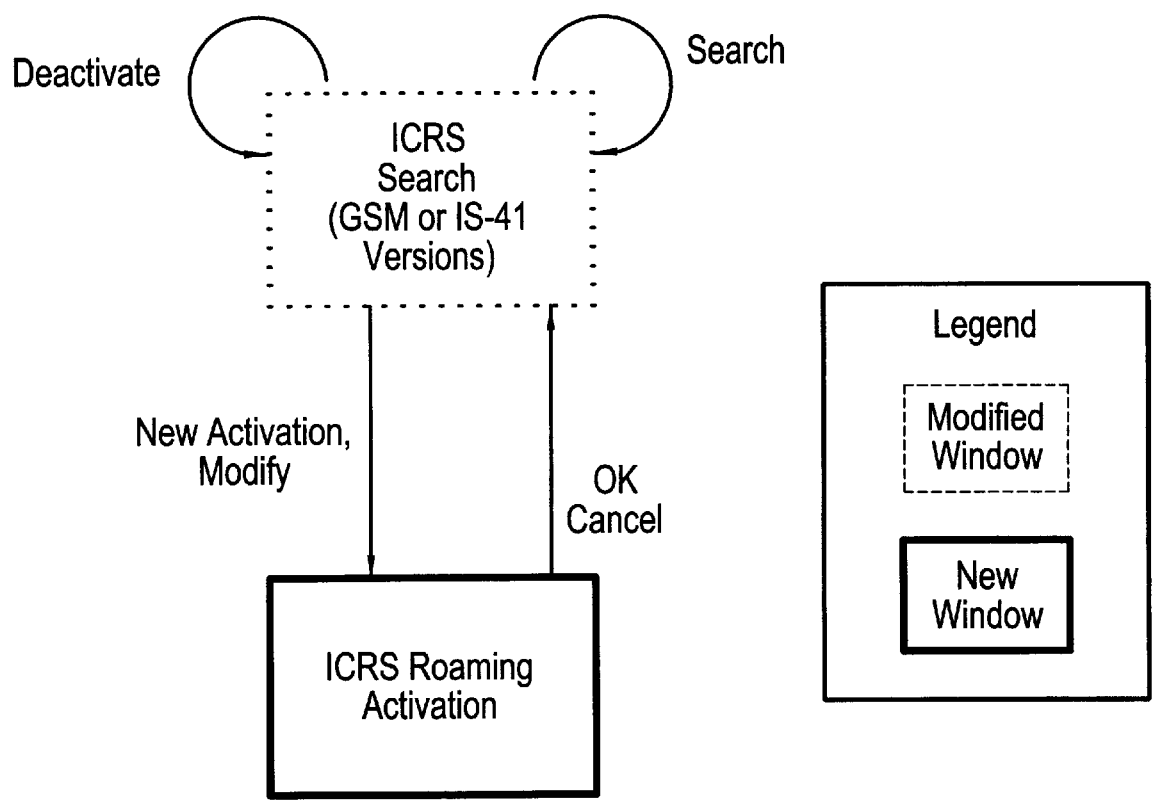
FIG. 12 is a diagram of the ICRS administration module.

FIG. 12 is a diagram of the ICRS administration module. ICRS Management windows allows the SP to provision IRIDIUM Cellular Roaming Service (ICRS). The windows provide views where the SP can monitor the status of roaming service. The windows also give the SP access to make changes to roaming service.

Figure 13:
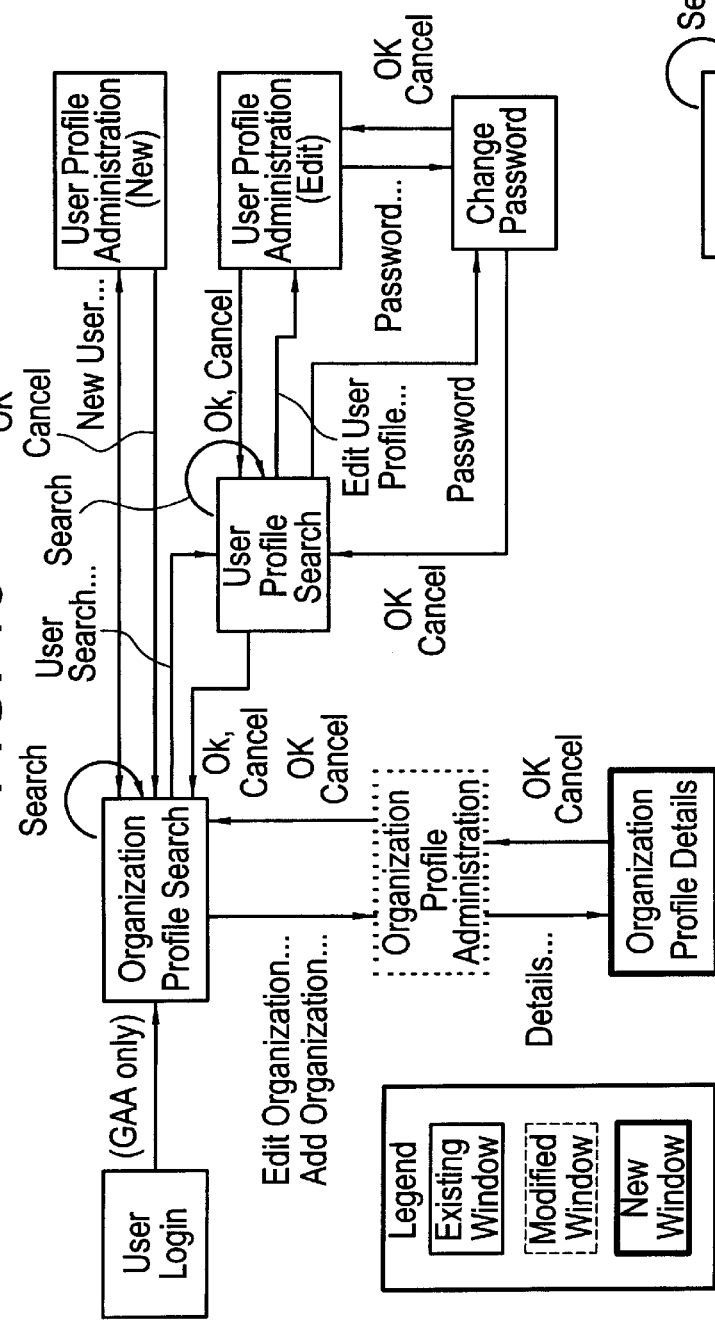
FIG. 13 is a diagram of the System Administration module.

FIG. 13 is a diagram of the System Administration module. System Administration (not shown) provides control for SP application setup. The SP can change passwords through System Administration windows. Gateway Administrators use the System Administration windows to manage system user information.

Figure 14:
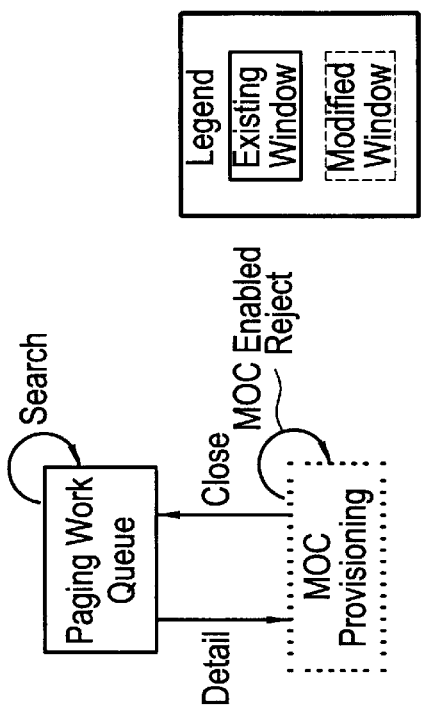
FIG. 14 is a diagram of the paging provisions module.

FIG. 14 is a diagram of the paging provisions module. Paging Provisioning allows MOC attendants to enter requests for paging service into MOC. This module details procedures that focus on the features and functionality of the Paging Work Queue Window and MOC Provisioning Window.

Data Definition

Java Client Object Model

The SPNet Object Model uses the strengths of object-oriented technology by representing each class in a distinct object layer: presentation, business object, and utility object layer.

The object layer descriptions are as follows:

| Layer | Description | Interfacing Layers |
|---|---|---|
| Presentation Layer | Includes all GUI development (Windows, Event Handlers). | Business Object Layer, Utility Objects |
| Business Object Layer | Contains a parent business object class and one class for each business object required. For example, one class for Customer, one class for Address, etc. Communicates with the SPNet server via CORBA methods (refer to the SPNet Execution Architecture document for details). | Presentation Layer, Utility Objects |
| Utility Objects | Includes all shared classes that span multiple layers. | Presentation Layer, Business Object |

-continued

| Layer | Description | Interfacing Layers |
|---|---|---|
| | For example, user profile, error handling, parser classes, etc. | Layer |

IRIDIUM-homed subscription data is captured and maintained in the BSCS Oracle database tables. Data is transferred into these tables through SPNet's QA/BSCS Interface to the BSCS Customer Administration client. Most of the subscription data is transferred into BSCS using the system's standard GSM or ERMES fields. Some text fields, combo boxes, and checkboxes in the Customer Administration client may be configured per application.

The following tables are exemplary.

Oracle Database Tables

SPNet ICRS Request Table (SPN_ICRS$_{13}$ REQ)

This existing table contains all ICRS provisioning requests.

| Data Field Name | Add, Remove, Modify, No change | Type and Length | Description (Values, Defaults, Mandatory/Optional) | Data Source |
|---|---|---|---|---|
| ICRS_REQ_ID | No change | Number (12) | Mandatory. Non-unique. ICRS provisioning request id relating requests submitted simultaneously by SPNet. | Oracle sequence inserted by SPNet |
| ICRS_SUB_REQ_ID | Add | Number (12) | Mandatory. Unique. ICRS sub-request id. | Oracle sequence inserted by SPNet |
| SP_ORG_ID | No change | Varchar2 (8) | Mandatory. Identifies the SPNet organization. | SPNet defaults based on user login. |
| ICRS_REQ_BAT_ID | No change | Number (12) | Mandatory. Request batch id. SPNet defaults a '0'. | SPNet enters '0'. ICRS Update Handler assigns the batch id. |
| RELEASE_VERSION | Add | Varchar2 (20) | Optional. Release version of the GBS: 1.0 or 1.0.1 | SPNet |
| ICRS_REQ_NETWRK | Add | Integer | Mandatory. Subscriber's home network type: IRIDIUM- (1), GSM- (2), or IS-41-homed (3) | SPNet |
| ICRS_REQ_TYPE | No change | Integer | Mandatory. Type of provisioning request: Subscription (1), Equipment (2) | SPNet |
| ICRS_REQ_ACTION | Add | Integer | Mandatory. Request actions (subtype): Subscription: Activate (1), Deactivate (2), Modify IMSI (3), Modify MSISDN (4), Modify home MIN (5), Modify home ESN (6) Equipment: Activate IRM/ESN (1), Deactivate IRM/ESN (2) | SPNet |
| ICRS_REQ_STATE | No change | Integer | Mandatory. Request states: Not ready (0), Ready (1), Batched/sent (70), Provisioned/Complete (100), Erred (200) | SPNet, ICRS Update Handler (IUH), ICRS Confirmation Batch (ICB) |
| USR_LOGON_ID | No change | Varchar2 (20) | Mandatory. User entering request. | SPNet defaults based on user login. |
| ICRS_REQ_DATE | No change | Number (38) | Mandatory. Date requested. | SPNet |
| ICRS_REQ_IMSI | No change | Varchar2 (50) | Optional. Requesting IMSI for an ICRS subscriber: | User enters the GSM IMSI for non-IMSI-in-the- |

-continued

| Data Field Name | Add, Remove, Modify, No change | Type and Length | Description (Values, Defaults, Mandatory/Optional) | Data Source |
|---|---|---|---|---|
| | | | IRIDIUM GW-homed IMSI (IRIDIUM-homed subscriber), GSM cellular-homed IMSI (GSM-homed), or an IRIDIUM IIU-homed IMSI (IS-41-homed). For modify requests, this is the current IMSI. | clear roaming partners. For all others, SPNet enters based on SIM serial number entered by SPNet user |
| ICRS_NEW_MIN | Remove | Varchar2 (15) | | |
| ICRS_NEW_ESN | Remove | Varchar2 (11) | | |
| ICRS_NEW_MSISDN | Remove | Varchar2 (20) | | |
| ICRS_NEW_IMSI | Remove | Varchar2 (50) | | |
| ICRS_HOME_PORT | Add | Varchar2 (50) | Optional, to allow for IMSI in the Clear. Home port number: IRIDIUM GW-homed IMSI (IRIDIUM-homed), GSM cellular-homed IMSI (GSM-homed), or an IS-41 cellular-homed ESN (IS-41-homed) | SPNet |
| ICRS_HOME_DN | Add | Varchar2 (20) | Optional, to allow for IMSI in the Clear. Home directory number (dialable): IRIDIUM MSISDN (IRIDIUM-homed), GSM cellular MSISDN (GSM-homed), or IS-41 cellular MIN (IS-41-homed) | SPNet |
| ICRS_ROAM_PORT | Add | Varchar2 (50) | Optional. Port number for roaming onto target network: IRIDIUM ESN (IRIDIUM-; GSM-, and IS-41-homed roaming onto IS-41); or IRIDIUM IIU-homed IMSI (IS-41-homed roaming onto GSM/IRIDIUM) | SPNet |
| ICRS_ROAM_DN | Add | Varchar2 (20) | Optional. Directory number for roaming onto target network: IRM (IRIDIUM-, GSM-, and IS-41-homed roaming onto IS-41); or ICRS MSISDN (IS-41-homed roaming onto GSM/IRIDIUM) | SPNet |
| ICRS_SPN_ERR_MSG | No change | Varchar2 (2000) | Optional. Error message received from IIU. | ICB |
| ICRS_EFFECTIVE_DATE | No change | Date | Optional. Data provisioning confirmation received. | ICB |
| ICRS_REQ_NOTIFICATION_DATE | No change | Date | Optional. Date email notification sent to requesting organization. | SPNet |
| ICRS_REQ_ERR_ID | No change | Integer | Optional. Internal error codes. | SPNet, IUH, ICB |
| ICRS_REQ_SIM_SERIAL_NBR | No change | Varchar2 (50) | Optional. SIM used for IMSI in the clear functionality. | SPNet |

The following tables exhibit sample data in the SPNet ICRS Request Table (SPN_ICRS_REQ). The implementation of this interface is modified to handle the increased ICRS functionality included in the IBSS. Only the fields most affected by the implementation are displayed. Note that a single ICRS request can be broken into separate atomic transactions for the IIU interface. Each row will be handled as a single transaction by the IIU interface.

| Req_ID | Req_Network | Req_Type | Req_Action | Req_IMSI | Home_Port | Home_DN | Roam_Port | Roam_DN |
|---|---|---|---|---|---|---|---|---|
| | | | | Activations | | | | |
| 101 | IRID. (1) | Sub (1) | Activate (1) | IRID. IMSI | IRID. IMSI | IRID. MSISDN | IRID. ESN | IRM |
| 101 | IRID. (1) | Equip (2) | Activate (1) | IRID. IMSI | IRID. IMSI | IRID. MSISDN | IRID. ESN | IRM |

-continued

| Req_ID | Req_Network | Req_Type | Req_Action | Req_IMSI | Home_Port | Home_DN | Roam_Port | Roam_DN |
|---|---|---|---|---|---|---|---|---|
| 102 | GSM (2) | Sub (1) | Activate (1) | IMSI | IMSI | MSISDN | IRID. ESN | IRM |
| 102 | GSM (2) | Equip (2) | Activate (1) | IMSI | IMSI | MSISDN | IRID. ESN | IRM |
| 103 | IS-41 (3) | Sub (1) | Activate (1) | ICRS IMSI | ESN | MIN | ICRS IMSI | ICRS MSISDN |
| 103 | IS-41 (3) | Equip (2) | Activate (1) | ICRS IMSI | ESN | MIN | IRID. ESN | IRM |
| 103 | IS-41 (3) | Equip (2) | Activate (1) | ICRS IMSI | ESN | MIN | IRID. ESN | IRM |
| 103 | IS-41 (3) | Equip (2) | Activate (1) | ICRS IMSI | ESN | MIN | IRID. ESN | IRM |
| 103 | IS-41 (3) | Equip (2) | Activate (1) | ICRS IMSI | ESN | MIN | IRID. ESN | IRM |
| Deactivations | | | | | | | | |
| 104 | IRID. (1) | Sub (1) | Deactivate (2) | IRID. IMSI | IRID. IMSI | IRID. MSISDN | | |
| 105 | GSM (2) | Sub (1) | Deactivate (2) | IMSI | IMSI | MSISDN | | |
| 106 | IS-41 (3) | Sub (1) | Deactivate (2) | ICRS IMSI | ESN | MIN | ICRS IMSI | ICRS MSISDN |
| Modifications (Subscription only) | | | | | | | | |
| 107 | IRID. (1) | Sub (1) | Modify IMSI (3) | IRID. IMSI (current) | IRID. IMSI (new) | IRID. MSISDN | | |
| 108 | IRID. (1) | Sub (1) | Modify MSISDN (4) | IRID. IMSI | IRID. IMSI | IRID. MSISDN (new) | | |
| 109 | GSM (2) | Sub (1) | Modify IMSI (3) | IMSI (current) | IMSI (new) | MSISDN | | |
| 110 | GSM (2) | Sub (1) | Modify MSISDN (4) | IMSI | IMSI | MSISDN (new) | | |
| 111 | IS-41 (3) | Sub (1) | Modify IMSI (3) | ICRS IMSI (current) | ESN | MIN | ICRS IMSI (new) | ICRS MSISDN |
| 112 | IS-41 (3) | Sub (1) | Modify home MIN (5) | ICRS IMSI | ESN | MIN (new) | ICRS IMSI | ICRS MSISDN |
| 113 | IS-41 (3) | Sub (1) | Modify home ESN (6) | ICRS IMSI | ESN (new) | MIN | ICRS IMSI | ICRS MSISDN |
| Equipment Activations/Deactivations | | | | | | | | |
| 114 | IRID. (1) | Equip (2) | Activate (1) | IRID. IMSI | IRID. IMSI | IRID. MSISDN | IRID. ESN | IRM |
| 115 | IRID. (1) | Equip (2) | Deactivate (2) | IRID. IMSI | IRID. IMSI | IRID. MSISDN | IRID. ESN | IRM |
| 116 | GSM (2) | Equip (2) | Activate (1) | IMSI | IMSI | MSISDN | IRID. ESN | IRM |
| 117 | GSM (2) | Equip (2) | Deactivate (2) | IMSI | IMSI | MSISDN | IRID. ESN | IRM |
| 118 | IS-41 (3) | Equip (2) | Activate (1) | ICRS IMSI | ESN | MIN | IRID. ESN | IRM |
| 119 | IS-41 (3) | Equip (2) | Deactivate (1) | ICRS IMSI | ESN | MIN | IRID. ESN | IRM |

SPNet ICRS Subscriber Table (SPN_ICRS_SUB)

This existing table contains data regarding active and deactive ICRS subscriptions. This table is used by the SPNet application's Contract and ICRS Administration Modules to read and display ICRS-related subscription information and to generate ICRS provisioning requests. The table is maintained by the ICRS Confirmation Batch, which records ICRS provisioning requests that have been activated or deactivated on the IIU.

| Data Field Name | Add, Modify, No change | Type and Length | Description (Values, Defaults, Mandatory/Optional) | Data Source |
|---|---|---|---|---|
| IA_IMSI | No change | Varchar (50) | Mandatory. Primary key. ICRS subscriber IMSI: IRIDIUM GW-homed IMSI (IRIDIUM-homed subscriber), GSM cellular-homed IMSI (GSM-homed), or IRIDIUM IIU-homed IMSI (IS-41-homed). | ICRS Confirmation Batch (ICB) |
| IA_MSISDN | Modify | Varchar2 (20) | Mandatory. ICRS subscriber MSISDN: IRIDIUM MSISDN (IRIDIUM-homed subscriber), external GSM MSISDN (GSM-homed), or ICRS MSISDN (IS-41-homed). | ICB |
| IA_MIN | Modify | Varchar2 (15) | Optional. Home MIN for an IS-41-homed subscriber. | ICB |
| IA_ESN | Modify | Varchar2 (11) | Optional. Home ESN for an IS-41-homed subscriber. | ICB |
| SP_ORG_ID | No change | Varchar2 (8) | Mandatory. Identifies the SPNet organization. | ICB |

-continued

| Data Field Name | Add, Modify, No change | Type and Length | Description (Values, Defaults, Mandatory/Optional) | Data Source |
| --- | --- | --- | --- | --- |
| IA_STATUS | No change | Varchar2 (20) | Mandatory. Indicates the service is activated (2), deactivated (4), or pending deletion (99) | ICB |
| IA_STATUS_CHG_DATE | No change | Number (38) | Mandatory. This field contains the date the status of the roaming service was changed. | ICB |
| IA_SIM_SERIAL_NUMBER | No change | Varhar2 (50) | Optional. This is the SIM associated to the request for an IMSI in the clear subscription. | ICB |
| IA_NETWRK | Add | INTEGER | Mandatory. Subscriber's home network type: IRIDIUM- (1), GSM- (2), or IS-41-homed (3) | ICB |

SPNet Subscriber Equipment Table (SPN_ICRS_SUB_EQUIP)

This table contains all IS-41 equipment information (IRM/ESN pairs) for ICRS subscriptions, except an IS-41 subscriber's home MIN/ESN pair. The IA_IMSI field relates equipment to an ICRS subscription's IMSI in the SPNet ICRS Subscriber table (SPN_ICRS_SUB). A status code will indicate whether the equipment is activated or deactivated on the IIU. In addition, each active IRM/ESN pair is unique.

The SPNet application's Contract and ICRS Administration Modules use this table to read and display subscriber equipment information and to generate ICRS provisioning requests. The table is maintained by the ICRS Confirmation Batch, which records ICRS provisioning requests that have been activated or deactivated on the IIU.

| Data Field Name | Add, Modify, No change | Type and Length | Description (Values, Defaults, Mandatory/Optional) | Data Source |
| --- | --- | --- | --- | --- |
| IA_IMSI | Add | Varchar (50) | Mandatory. Foreign key to SPN_ICRS_SUB. Relates IS-41 equipment to an ICRS subscription. | ICRS Confirmation Batch (ICB) |
| SH_MIN | Add | Varchar2 (15) | Mandatory. IRM (IRIDIUM-, GSM-, and IS-41-homed subscribers). | ICB |
| SH_ESN | Add | Varchar2 (11) | Mandatory. IRIDIUM ESN (IRIDIUM-, GSM-, and IS-41-homed subscribers). | ICB |
| SH_STATUS | Add | Integer | Mandatory. Status of the equipment. Activated (2), Deactivated (4) | ICB |
| SH_STATUS_DATE | Add | Number (38) | Mandatory. Date status set. | ICB |

SPNet Organization Profile Table (SPN_ORG_PROF)

This existing table contains profiles for organizations using the SPNet application.

| Data Field Name | Add, Modify, No change | Type and Length | Description (Values, Defaults, Mandatory/Optional) | Data Source |
| --- | --- | --- | --- | --- |
| SP_ORG_ID | No change | Varchar2 (8) | Mandatory. SPNet organization id. Format is XXXXNNNN where 'X' and 'N' represent alphanumeric and numeric characters. | User enters the alphanumeric characters in SPNet and SPNet assigns the numeric characters. |
| SP_ORG_NM | No change | Varchar2 (40) | Optional. Name of the organization associated to the organization id. | User enters into SPNet |

-continued

| Data Field Name | Add, Modify, No change | Type and Length | Description (Values, Defaults, Mandatory/Optional) | Data Source |
|---|---|---|---|---|
| SP_ORG_ROAM_PRTN | No change | Varchar2 (20) | Optional. Customer code identifying the dealer outlet entity in BSCS for a roaming partner. | User enters into SPNet. |
| SP_ORG_DLR_CODE | No change | Varchar2 (20) | Optional. Customer code identifying the dealer outlet entity in BSCS for a service provider, Gateway dealer, or Gateway itself. | User enters into SPNet. |
| SP_ORG_CUST_CODE | No change | Varchar2 (20) | Optional. Customer code identifying the customer entity in BSCS for a FSSP. | User enters into SPNet. |
| SP_ORG_EMAIL | No change | Varchar2 (250) | Optional. Email address for sending provisioning notifications. | User enters into SPNet. |
| SP_ORG_LANG | No change | Varchar2 (20) | Mandatory. Language. | User enters into SPNet. |
| SP_ORG_TYPE | No change | Integer | Mandatory. Organization types. Gateway (1), FSSP (2), LSSP (3), Dealer (4), GSM Roam. Partner (5), IS-41 Roam. Partner (6). | User enters into SPNet. |
| SP_ORG_NETWRK | No change | Varchar2 (20) | Optional. Identifies the network type for a service provider which is also a roaming partner. GSM (1) or IS-41 (1). | User enters into SPNet. |
| SP_ORG_TAP_TO_CIBER | Removed | Integer | | |
| SP_ORG_CAPCODE_MAX | No change | Integer | Optional. Maximum number of capcodes allowed to be generated. | User enters into SPNet. |
| SP_ORG_ORDER_METHOD | No change | Integer | Optional. Capcode/MTD ordering method used. Gateway orders (1) or Service Provider orders (2). | User enters into SPNet. |
| SP_ORG_SIM_8816_PREFIX | Modify | Varchar2 (20) | Optional. Prefix populated in the SIM serial number field of the Telephony Contract Window for 8816 Voice Services. | User entry through SPNet. |
| SP_ORG_MSISDN_8816_PREFIX | Modify | Varchar2 (20) | Optional. Prefix populated in the MSISDN field of the Telephony Contract Window for 8816 Voice Services. | User entry through SPNet. |
| SP_ORG_SIM_8817_PREFIX | Add | Varchar2 (20) | Optional. The organization's prefix populated in the SIM serial number field of the Telephony Contract Window for 8817 Voice Services. | User enters into SPNet. |
| SP_ORG_MSISDN_8817_PREFIX | Add | Varchar2 (20) | Optional. The organization's prefix populated in the MSISDN field of the Telephony Contract Window for 8817 Voice Services. | User enters into SPNet. |
| SP_ORG_CAPCODE_PREFIX | No change | Varchar2 (20) | Optional. Prefix populated in the capcode field of the Paging Contract Window. | User enters into SPNet. |
| SP_ORG_ISDNA_PREFIX | No change | Varchar2 (20) | Optional. Prefix populated in the ISDNA field of the Paging Contract Window. | User enters into SPNet. |
| SP_ORG_MIN_PREFIX | No change | Varchar2 (20) | Optional. Prefix populated in home MIN field of the ICRS Roaming Activation Window. | User enters into SPNet. |
| SP_ORG_CUST_GROUP | No change | Varchar2 (40) | Optional. Customer group assigned to customers of this organization. | User enters into SPNet. |
| SP_ORG_COUNTRY | No change | Varchar2 (40) | Optional. Specifies field rights used. | User enters into SPNet. |
| REC_VERSION | No change | Integer | Mandatory. Record version for optimistic locking. | SPNet assigns value when created/updated. |
| SP_ORG_IMSI_CLEAR | No change | Number (1) | Optional. Signifies whether the organization is set up for IMSI in the Clear functionality. | User enters into SPNet |

-continued

| Data Field Name | Add, Modify, No change | Type and Length | Description (Values, Defaults, Mandatory/Optional) | Data Source |
| --- | --- | --- | --- | --- |
| SP_ORG_IMSI_SWAP | No change | Integer | Mandatory. Contains the FSSP option of the FSSP | User enters into SPNet |
| SP_ORG_NBR | No change | Integer | Mandatory. Value assigned by the SPNet application. | SPNet |

SPNet Request Paging Contract Information Table (SPN_REQ_PAG_CNTR)

This existing table contains paging contract data gathered from the SPNet client. The GNS service indicator column will be modified to hold a larger integer value to support ICRS GNS service codes.

| Data Field Name | Add, Modify, No change | Type and Length | Description (Values, Defaults, Mandatory/Optional) | Data Source |
| --- | --- | --- | --- | --- |
| PC_GNS_SVC | Modify | Integer | Optional. This is an indicator of the GNS service type of the paging contract if one exists. | SPNet |

Interfaces

Status Update Handler (SUH)

To support IRIDIUM Satellite Voice and Paging subscription notifications to the IBS, Status Update files are created by the Status Update Handler (SUH) from kernel request tables. The files detail service status updates of activations, deactivations, and updates that were made, for a given GBS, on their Network Elements. Each Status Update File contains contract and service information for changes made to the IRIDIUM network since the prior file was generated. After generating a Status Update File, the SUH places the file in a staging directory and creates a UNIX symbolic link (i.e. a pointer) to the file in a collection directory.

ICRS UPDATE HANDLER (IUH)

To support ICRS subscription notification to the IBS, ICRS update files are created by the ICRS Update Handler (IUH) from SPNet database tables. The files detail service status updates of activations, deactivations, and updates to be made, for a given Gateway, in the IIU. Each ICRS Update File contains contract and service information for changes made to the IRIDIUM network since the prior file was generated.

ICRS Confirmation Batch (ICB)

The ICB is a UNIX K shell script that reads a file manually created by the IIU Attendant and updates the SPNet database tables (SPN_ICRS_REQ and SPN_ICRS_SUB) with the status of activation, modification, and deactivation requests on the IIU (Iridium Interworking Unit). The confirmation files enable IBS system administrators to communicate with the GBS by resubmitting erred records and erred files. GBS system administrators use these files to determine which records or file must be recreated. This is illustrated in FIG. 15.

FIG. 15 shows the ICRS Confirmation Batch logic flow. The ICB's main task is to update the SPN_ICRS_REQ and SPN_ICRS_SUB database tables with the result from IIU provisioning. It also checks the confirmation file to determine it's integrity. This occurs by insuring the number of records processed in the SPN_ICRS_REQ table is equal to the number of records indicated in the header information. Only error records are written in the ICB confirmation file. All other records are assumed to be processed normally by the IIU.

Vendor Mediation Device (VMD)

Switch Provisioning Interface

To support the limited telephony service included in Iridium's 8817 offering, the VMD will provision a 'Barring of Roaming' feature on the D900 for every 8817 subscriber. This feature prevents the subscriber from roaming onto another network (non-IRIDIUM). The provisioning of this feature can be accomplished through a VMD configuration file modification.

Also, in an attempt to prevent fraud, the VMD will check to make sure that the service package the GMD sends to the VMD for provisioning includes the '8817 Telephony Differential' supplementary service for all 8817 MSISDNs. Likewise, the converse will be checked, ensuring that 8816 MSISDNs will not have the '8817 Telephony Differential' service attached. This check will require a VMD code change to the normal processing flow for a GSM request.

Those of ordinary skill in the art can design suitable code and routines for implementing the functions described herein without departing from the scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing service activation capability from a global telecommunications system to Service Providers including the steps of:

utilizing a browser to download a program;

executing the program to provide for service provisioning; and accessing data stored relative to at least one customer of the service provider, wherein the service provider is limited in accessing data relative to the service provider customers and not the data of other service provider customers.

2. The method of claim 1 wherein the step of providing service provisioning includes the step of providing service activation.

3. The method of claim 2 wherein the step of providing service provisioning includes the step of providing service suspension.

4. The method of claim 3 wherein the step of providing service provisioning includes the step of providing service reactivation.

5. The invention of claim 4 wherein the step of providing service provisioning includes the step of providing service deactivation.

6. The method of claim 1 wherein the browser is a Web browser.

7. The invention of claim 1 wherein the program is a Java application.

8. The method of claim 1 including the step of provisioning telephony services.

9. The invention of claim 1 including the step of provisioning paging services.

10. The method of claim 1 including the step of provisioning roaming services.

11. The invention of claim 1 including the step of supporting capcode generation.

12. The method of claim 11 including the step of supporting capcode allocation.

13. The invention of claim 12 including the step of supporting capcode ordering.

14. The method of claim 1 including the step of supporting tracking and maintenance of capcode status during the provisioning process.

15. A method for providing activation functionality from network to Service Providers in a global telecommunications system including the steps of:

utilizing a Web browser to download a Java application;

executing the application to provide for service activation; and accessing data stored relative to at least one customer of the service provider, wherein the service provider is limited in accessing data relative to the service provider customers and not the data of other service provider customers.

16. The invention of claim 15 wherein the step of providing service activation includes the step of providing service suspension.

17. The method of claim 16 wherein the step of providing service activation includes the step of providing service reactivation.

18. The invention of claim 17 wherein the step of providing service activation includes the step of providing service deactivation.

19. The method of claim 15 including the step of provisioning telephony contracts.

20. The invention of claim 15 including the step of provisioning paging contracts.

21. The method of claim 15 including the step of provisioning roaming services.

22. The invention of claim 15 including the step of supporting capcode generation.

23. The method of claim 22 including the step of supporting capcode allocation.

24. The invention of claim 23 including the step of supporting capcode ordering.

25. The method of claim 15 including the step of supporting tracking and maintenance of capcode status during the provisioning process.

26. A system for providing activation functionality from network to Service Providers in a global telecommunications system including:

a computer connected to a server on a network;

a browser running on the computer;

a program downloadable by the browser for service provisioning, wherein the program grants access to data stored relative to at least one customer of the service provider, wherein the service provider is limited in accessing data relative to the service provider customers and not the data of other service provider customers.

27. The system of claim 26 wherein the program includes a routine for providing service activation.

28. The system of claim 27 wherein the program includes a routine for providing service suspension.

29. The system of claim 28 wherein the program includes a routine for providing service reactivation.

30. The system of claim 29 wherein the program includes a routine for providing service deactivation.

31. The system of claim 26 wherein the browser is a Web browser.

32. The system of claim 26 wherein the program is a Java application.

33. The system of claim 26 wherein the program includes a routine for provisioning telephony services.

34. The system of claim 26 wherein the program includes a routine for provisioning paging services.

35. The system of claim 26 wherein the program includes a routine for provisioning roaming services.

36. The system of claim 26 wherein the program includes a routine for supporting capcode generation.

37. The system of claim 36 wherein the program includes a routine for supporting capcode allocation.

38. The system of claim 37 wherein the program includes a routine for supporting capcode ordering.

39. The system of claim 26 wherein the program includes a routine for supporting tracking and maintenance of capcode status during the provisioning process.

* * * * *